US012810528B2

(12) United States Patent
Dearth et al.

(10) Patent No.: US 12,810,528 B2
(45) Date of Patent: Nov. 24, 2026

(54) COLLABORATIVE AUGMENTED REALITY MEASUREMENT SYSTEMS AND METHODS

(71) Applicant: Xactware Solutions, Inc., Lehi, UT (US)

(72) Inventors: Jared Dearth, Highland, UT (US); Zachary Cunningham, Smithfield, UT (US); Bradley Smith, Lehi, UT (US); Bunna Veth, Draper, UT (US); Doug De Voogt, Lehi, UT (US)

(73) Assignee: Xactware Solutions, Inc., Lehi, UT (US)

( * ) Notice: Subject to any disclaimer, the term of this patent is extended or adjusted under 35 U.S.C. 154(b) by 206 days.

(21) Appl. No.: 17/541,610

(22) Filed: Dec. 3, 2021

(65) Prior Publication Data

US 2022/0180592 A1 Jun. 9, 2022

Related U.S. Application Data

(60) Provisional application No. 63/121,156, filed on Dec. 3, 2020.

(51) Int. Cl.

*G06T 15/06* (2011.01)
*G06F 3/01* (2006.01)
*G06T 19/00* (2011.01)
*H04L 67/131* (2022.01)

(52) U.S. Cl.

CPC .............. *G06T 15/06* (2013.01); *G06F 3/011* (2013.01); *G06T 19/006* (2013.01); *H04L 67/131* (2022.05)

(58) Field of Classification Search

None

See application file for complete search history.

(56) References Cited

U.S. PATENT DOCUMENTS

| | | | | |
|---|---|---|---|---|
| 9,584,765 | B2 | 2/2017 | Polyakov et al. | |
| 10,304,254 | B2 * | 5/2019 | Jovanovic | G06T 17/00 |
| 10,579,207 | B2 * | 3/2020 | Piya | G06F 3/04815 |

(Continued)

OTHER PUBLICATIONS

Robin Berquist, Nicholas Stenback, "Using Augmented Reality to Measure Vertical Surfaces", 2018 (Thesis), Department of Computer and Information Science, Linkoping University, Linkoping, Sweden, pp. 3-11 (Year: 2018).*

(Continued)

*Primary Examiner* — Michael J Cobb

(74) *Attorney, Agent, or Firm* — McCarter & English, LLP

(57) ABSTRACT

Systems and methods for collaborative augmented reality measurement of an object using computing devices are provided. The system establishes an audio and video (A/V) connection between a mobile device of a first user and a remote device of a second user such that the second user can view and edit an augmented reality scene displayed on a display of the mobile device. The system receives a measurement tool selection from the first user or the second user to measure an object and/or feature present in the augmented reality scene. The system detects a plane of the augmented reality scene as a reference to position and capture points to execute a measurement of the object and/or feature. The system determines a measurement of the object and/or feature and transmits the measurement to a server.

43 Claims, 14 Drawing Sheets

210

(56) References Cited

U.S. PATENT DOCUMENTS

| | | | | |
|---|---|---|---|---|
| 10,785,269 | B2 | 9/2020 | Fink et al. | |
| 10,785,443 | B2 | 9/2020 | Fink et al. | |
| 10,839,551 | B2 | 11/2020 | Fink et al. | |
| 2015/0331576 | A1 * | 11/2015 | Piya | G06F 3/04815 715/850 |
| 2017/0078456 | A1 | 3/2017 | Navare et al. | |
| 2019/0050137 | A1 | 2/2019 | Mildrew et al. | |
| 2019/0146599 | A1 * | 5/2019 | Gunnarsson | G06F 3/0346 345/156 |
| 2019/0347859 | A1 | 11/2019 | Jovanovic et al. | |
| 2019/0378621 | A1 * | 12/2019 | Ellison | G06F 3/011 |
| 2020/0066044 | A1 | 2/2020 | Stahl et al. | |
| 2020/0357132 | A1 | 11/2020 | Jovanovic et al. | |
| 2020/0367970 | A1 * | 11/2020 | Qiu | A61B 90/36 |
| 2022/0180592 | A1 * | 6/2022 | Dearth | G06T 15/06 |

OTHER PUBLICATIONS

International Search Report of the International Searching Authority mailed on Feb. 24, 2022, issued in connection with International Application No. PCT/US22/61753 (3 pages).

Written Opinion of the International Searching Authority mailed on Feb. 24, 2022, issued in connection with International Application No. PCT/US22/61753 (16 pages).

European Search Report dated Oct. 8, 2024 issued by the European Patent Office in connection with European Patent Application No. 21901507.0 (11 pages).

Office Action dated Sep. 24, 2026, issued by the Canadian Intellectual Property Office issued in connection with Canadian Application No. 3,201,066 (3 pages).

* cited by examiner

270

300

COLLABORATIVE AUGMENTED REALITY MEASUREMENT SYSTEMS AND METHODS

RELATED APPLICATIONS

This application claims priority to U.S. Provisional Patent Application Ser. No. 63/121,156 filed on Dec. 3, 2020, the entire disclosure of which is hereby expressly incorporated by reference.

BACKGROUND

Technical Field

The present disclosure relates generally to augmented reality computing devices. More specifically, the present disclosure relates to a system and method for collaboratively measuring an object and/or a feature of a structure that may include a video and audio connection (e.g., a video collaboration web portal) between a user utilizing a mobile device and a remote user utilizing a computing device or as a stand-alone feature utilized by a mobile device user.

RELATED ART

In the insurance underwriting, building construction, solar, field services, and real estate industries, computer-based systems for generating floor plans and layouts of physical structures such as residential homes, commercial buildings, etc., objects within those homes (e.g., furniture, cabinets, appliances, etc.) is becoming increasingly important. In particular, to generate an accurate floor plan of a physical structure, one must have an accurate set of data which adequately describes that structure. Moreover, it is becoming increasingly important to provide computer-based systems which have adequate capabilities to measure interior and exterior features of buildings, as well as to measure specific interior objects and features of such buildings (e.g., a counter top length, a ceiling height, a room width, doors, windows, closets, etc.).

With the advent of mobile data capturing devices including phones and tablets, it is now possible to gather and process accurate data from sites located anywhere in the world. The data can be processed either directly on a hand-held computing device or some other type of device (provided that such devices have adequate computing power). However, industry professionals (e.g., a claims adjuster, a foreman, a utility installer, a real estate agent, etc.) are often not readily available for an on-site visit.

Accordingly, what would be desirable is a system and method for collaboratively measuring an object and/or feature of a structure that may include a video and audio connection (e.g., a video collaboration web portal) between a user (e.g., a homeowner) utilizing a mobile device and a remote user (e.g., an industry professional) utilizing a computing device or as a stand-alone feature utilized by a mobile device user.

SUMMARY

The present invention relates to systems and methods for collaborative augmented reality measurement of an object using computing devices. The system establishes an audio and video connection between a mobile device of a first user and a remote device of a second user such that the second user can view and edit an augmented reality scene displayed on a display of the mobile device of the first user. The system receives a measurement tool selection from the first user or the second user to measure an object and/or feature present in the augmented reality scene displayed on the display of the mobile device of the first user. Then, the system detects a plane (e.g., a vertical or horizontal plane) of the augmented reality scene as a reference to position and capture points to execute a measurement of the object and/or feature present in the augmented reality scene. The system determines a measurement of the object and/or feature based on the selected measurement tool and transmits the measurement of the object and/or feature to a server.

BRIEF DESCRIPTION OF THE DRAWINGS

The foregoing features of the invention will be apparent from the following Detailed Description of the Invention, taken in connection with the accompanying drawings, in which.

and

Figure 12:
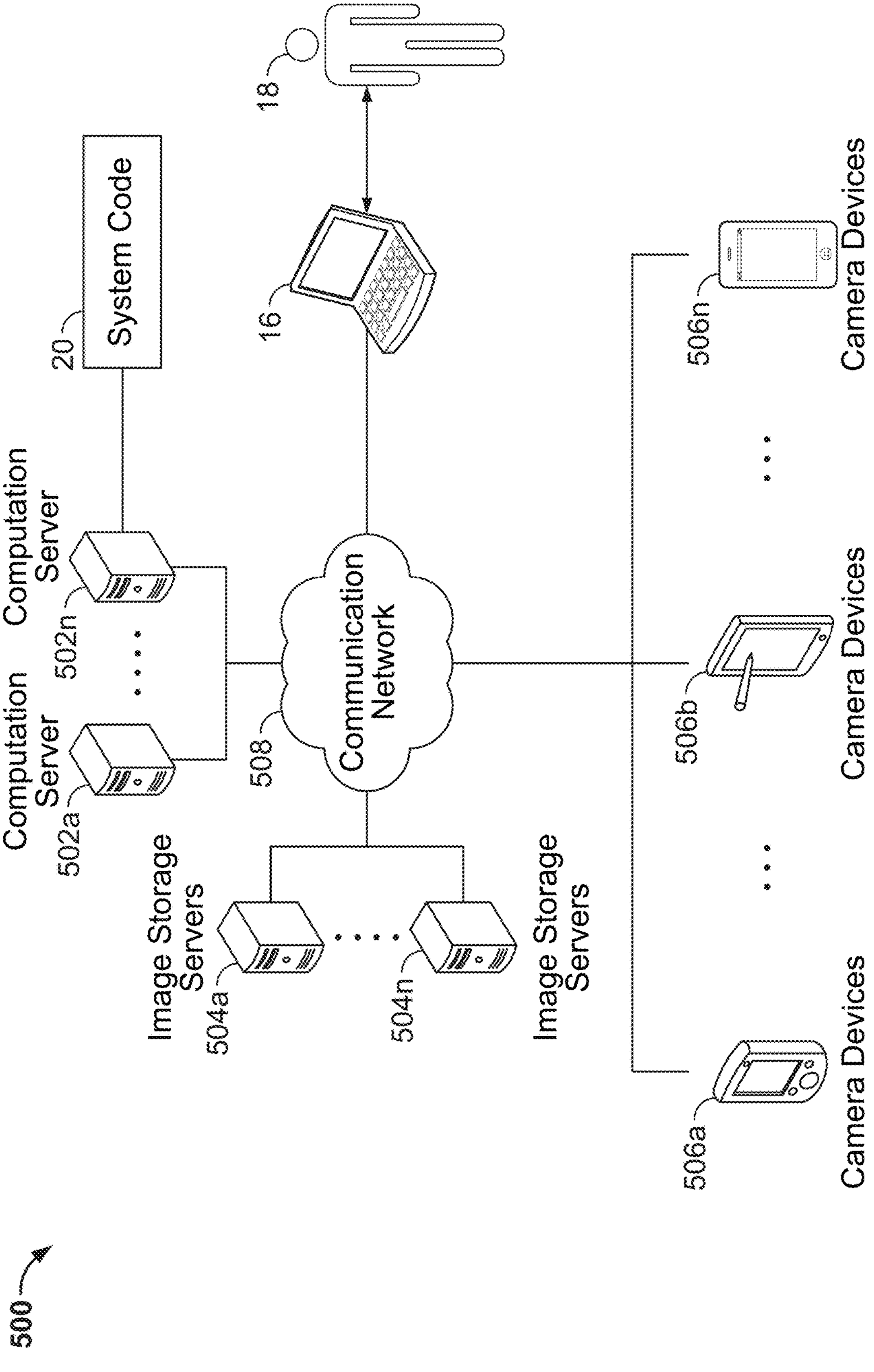

FIG. 12 is a diagram illustrating another embodiment of the system of the present disclosure.

DETAILED DESCRIPTION

The present disclosure relates to a system and method for the collaborative augmented reality measurement of an object using computing devices, as described in detail below in connection with FIGS. 1-12.

Figure 1:
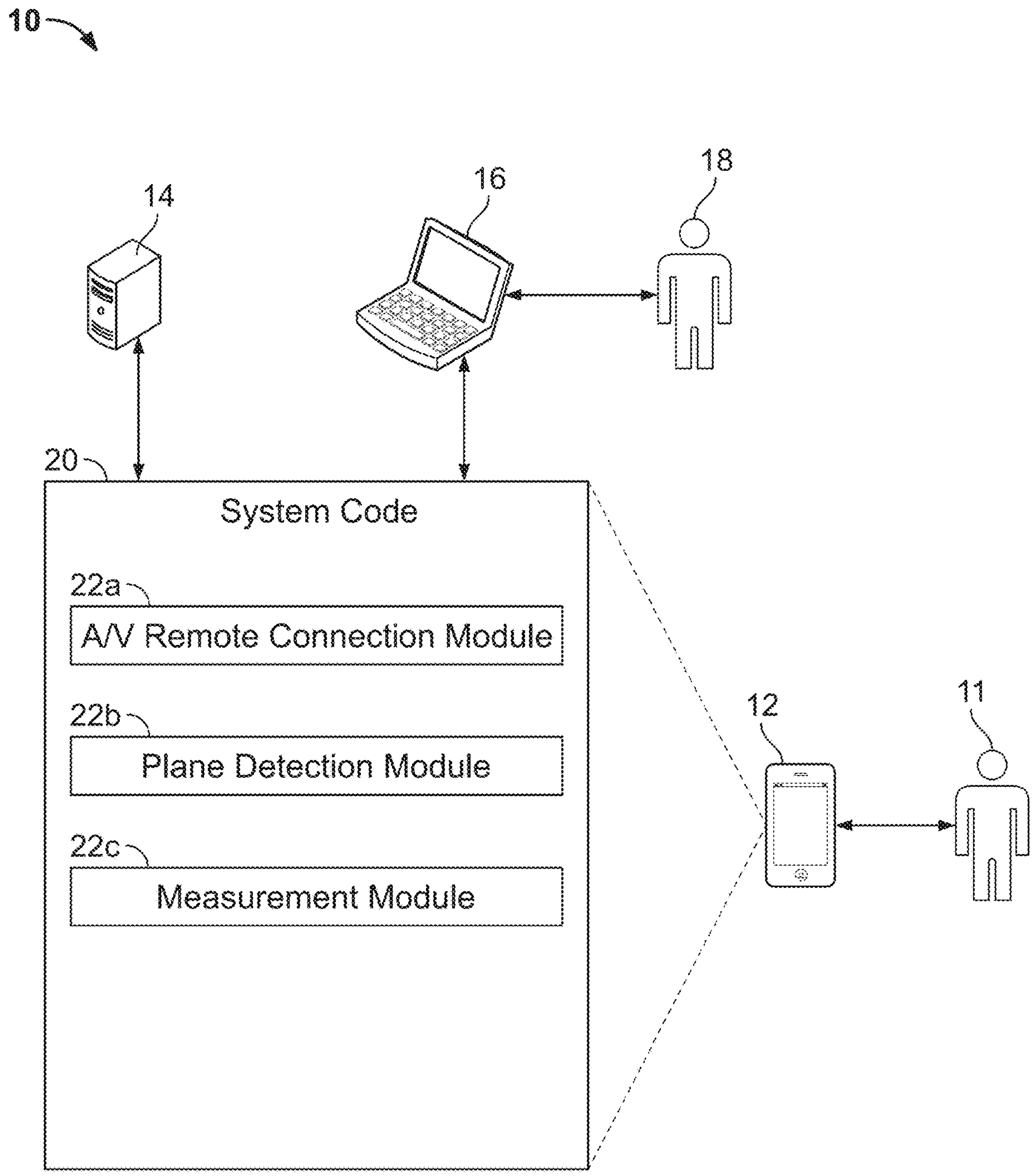
FIG. 1 is a diagram illustrating an embodiment of the system of the present disclosure.

Turning to the drawings, FIG. 1 is a diagram illustrating an embodiment of the system 10 of the present disclosure. The system 10 could be embodied as a central processing unit 12 (processor) of a first user 11 in communication with a server 14 and a second user 18 via a remote device 16. The processor 12 and the remote device 16 could include, but are not limited to, a computer system, a server, a personal computer, a cloud computing device, a smart phone, or any other suitable device programmed to carry out the processes disclosed herein. The system 10 could measure at least one object and/or feature of a structure by utilizing the processor 12 and the remote device 16. The server 14 could include digital images and/or digital image datasets comprising annotated images of objects and/or features of a structure indicative of respective measurements of the objects and/or features of the structure. Further, the datasets could include, but are not limited to, images of residential and commercial buildings. The server 14 could store one or more three-dimensional representations of an imaged structure including objects and features thereof, and the system 10 could operate with such three-dimensional representations. As such, by the terms "image" and "imagery" as used herein, it is meant not only optical imagery, but also three-dimensional imagery and computer-generated imagery. The processor 12 executes system code 20 which establishes a video and audio connection between the processor 12 and the remote device 16 and provides for local and/or remote measurement of an object and/or a feature of a structure.

The system 10 includes system code 20 (non-transitory, computer-readable instructions) stored on a computer-readable medium and executable by the hardware processor 12 or one or more computer systems. The code 20 could include various custom-written software modules that carry out the steps/processes discussed herein, and could include, but is not limited to, an audio/video (A/V) remote connection module 22*a*, a plane detection module 22*b*, and a measurement module 22*c*. The code 20 could be programmed using any suitable programming languages including, but not limited to, Swift, Kotlin, C, C++, C #, Java, Python or any other suitable language. Additionally, the code 20 could be distributed across multiple computer systems in communication with each other over a communications network, and/or stored and executed on a cloud computing platform and remotely accessed by a computer system in communication with the cloud platform. The code 20 could communicate with the server 14 and the remote device 16, which could be stored on one or more other computer systems in communication with the code 20.

Still further, the system 10 could be embodied as a customized hardware component such as a field-programmable gate array ("FPGA"), application-specific integrated circuit ("ASIC"), embedded system, or other customized hardware components without departing from the spirit or scope of the present disclosure. It should be understood that FIG. 1 is only one potential configuration, and the system 10 of the present disclosure can be implemented using a number of different configurations.

Figure 2:
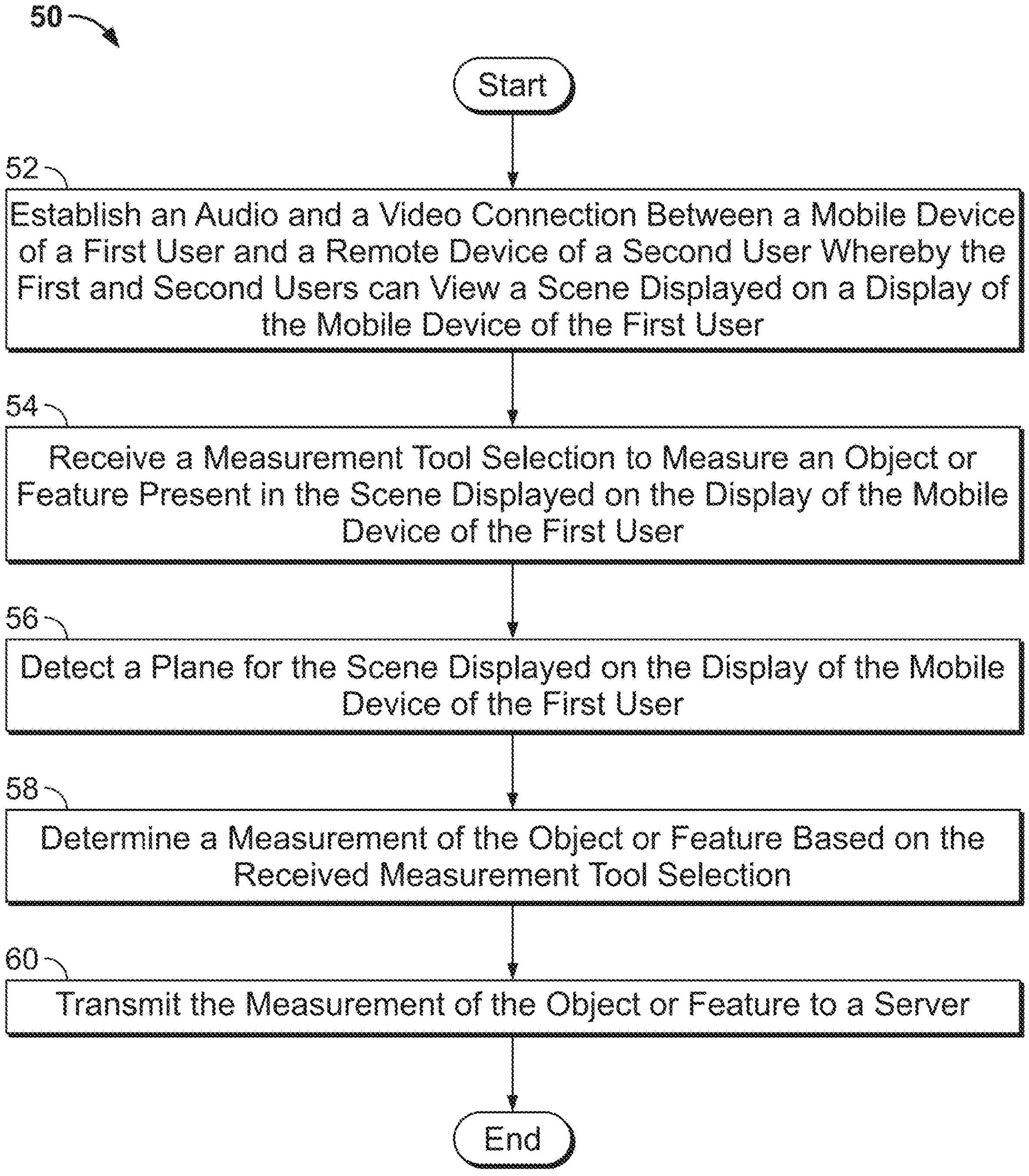
FIG. 2 is a flowchart illustrating overall processing steps carried out by the system of the present disclosure.

FIG. 2 is a flowchart illustrating overall processing steps 50 carried out by the system 10 of the present disclosure. Beginning in step 52, the system 10 establishes an A/V connection between the mobile device 12 of the first user 11 and the remote device 16 of the second user 18 such that the first and second users 11, 18 can view an augmented reality scene. In particular, the system 10 can capture a current frame of an augmented reality scene displayed on the display of the mobile device 12 as an image, convert the image to a pixel buffer, and transmit the pixel buffer to the remote device 16 utilizing a video client software developer kit (SDK). This transmission can occur several times per second to yield a live video stream of the local augmented reality scene displayed on the display of the mobile device 12. In step 54, the system 10 receives a measurement tool selection from the first user 11 or the second user 18 to measure an object and/or feature present in the scene displayed on the display of the mobile device 12 of the first user 11. It should be understood that the system 10 includes a variety of measurement tools for measuring specific objects and/or features of a structure including, but not limited to, a line segment tool, a line polygon prism tool, and a rectangle polygon prism tool. Then, in step 56, the system 10 detects a plane (e.g., a vertical or horizontal plane) of the augmented reality scene as a reference to position and capture points to execute a measurement of the object and/or feature present in the augmented reality scene. In step 58, the system 10 determines a measurement of the object and/or feature based on the selected measurement tool. In step 60, the system 10 transmits the measurement of the object and/or feature to the server 14. It should be understood that the measurement transmitted to the server 14 is accessible to the second user 18 after termination of the A/V connection between the mobile device 12 and the remote device 16.

Figure 3:
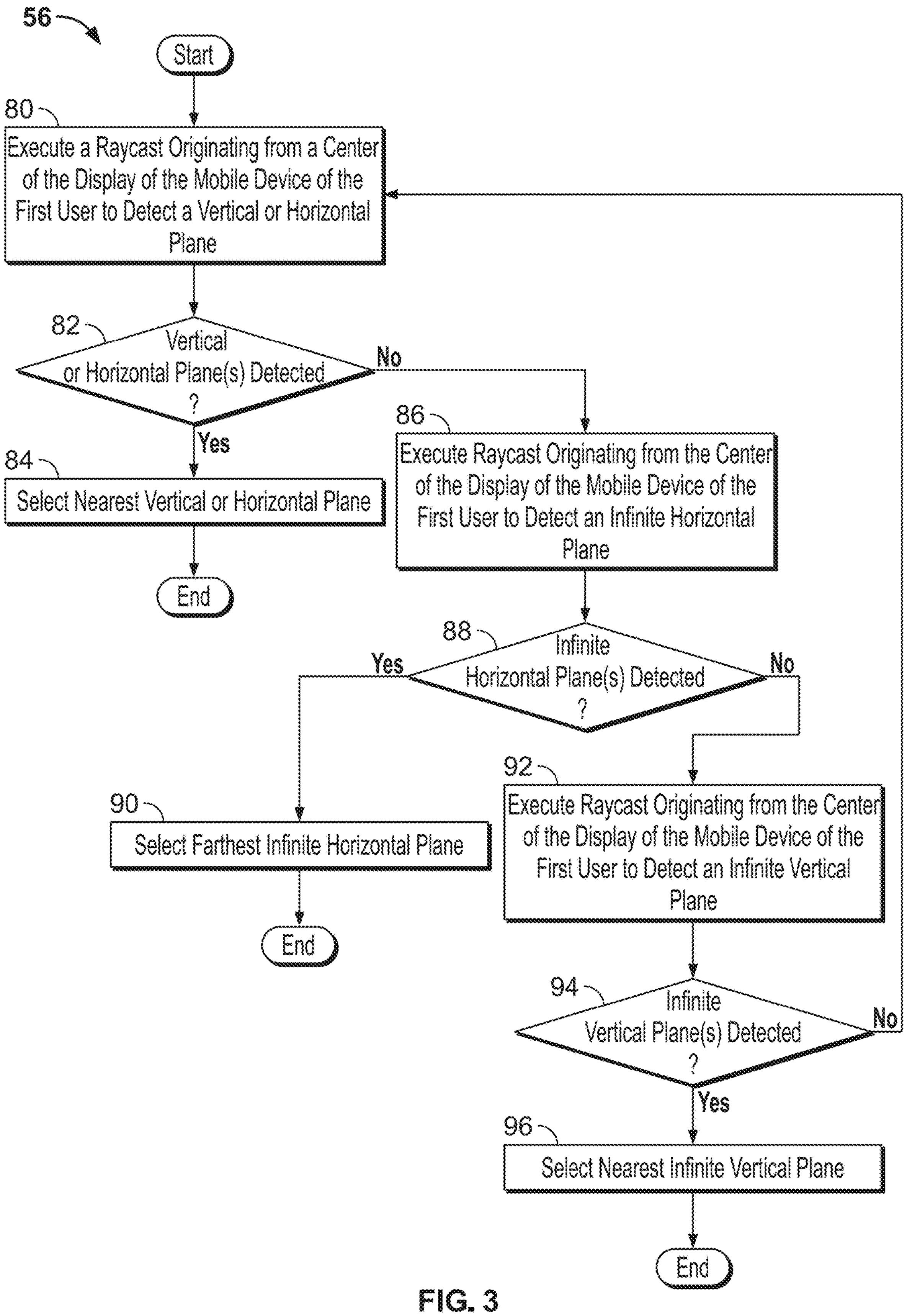
FIG. 3 is a flowchart illustrating step 56 of FIG. 2 in greater detail.

FIG. 3 is a flowchart illustrating step 56 of FIG. 2 in greater detail. In particular, FIG. 3 illustrates processing steps carried out by the system 10 for vertical or horizontal plane detection. In step 80, the system 10 executes a raycast originating from a center of the display of the mobile device 12 to detect a vertical or horizontal plane. In step 82, the system 10 determines whether a vertical or horizontal plane is detected. If the system 10 detects a vertical or horizontal plane, then the process proceeds to step 84. In step 84, the system 10 selects a nearest detected vertical or horizontal plane relative to the center of the display and the process ends. Alternatively, if the system 10 does not detect a vertical or horizontal plane, then the process proceeds to step 86. In step 86, the system 10 executes a raycast originating from the center of the display of the mobile device 12 to detect an infinite horizontal plane. In step 88, the system 10 determines whether an infinite horizontal plane is detected. If the system 10 detects an infinite horizontal plane, then the process proceeds to step 90. In step 90, the system 10 selects a farthest infinite horizontal plane relative to the center of the display and the process ends. Alternatively, if the system 10 does not detect an infinite horizontal plane, then the process proceeds to step 92. In step 92, the system 10 executes a raycast originating from the center of the display of the mobile device 12 to detect an infinite vertical plane. In step 94, the system 10 determines whether an infinite vertical plane is detected. If the system 10 detects an infinite vertical plane, then the process proceeds to step 96. In step 96, the system 10 selects a nearest infinite vertical plane relative to the center of the display and the process ends. Alternatively, if the system 10 does not detect an infinite vertical plane, then the process returns to step 80. It should be understood that the system 10 carries out the plane detection processing steps until a plane is detected.

Figure 4A:
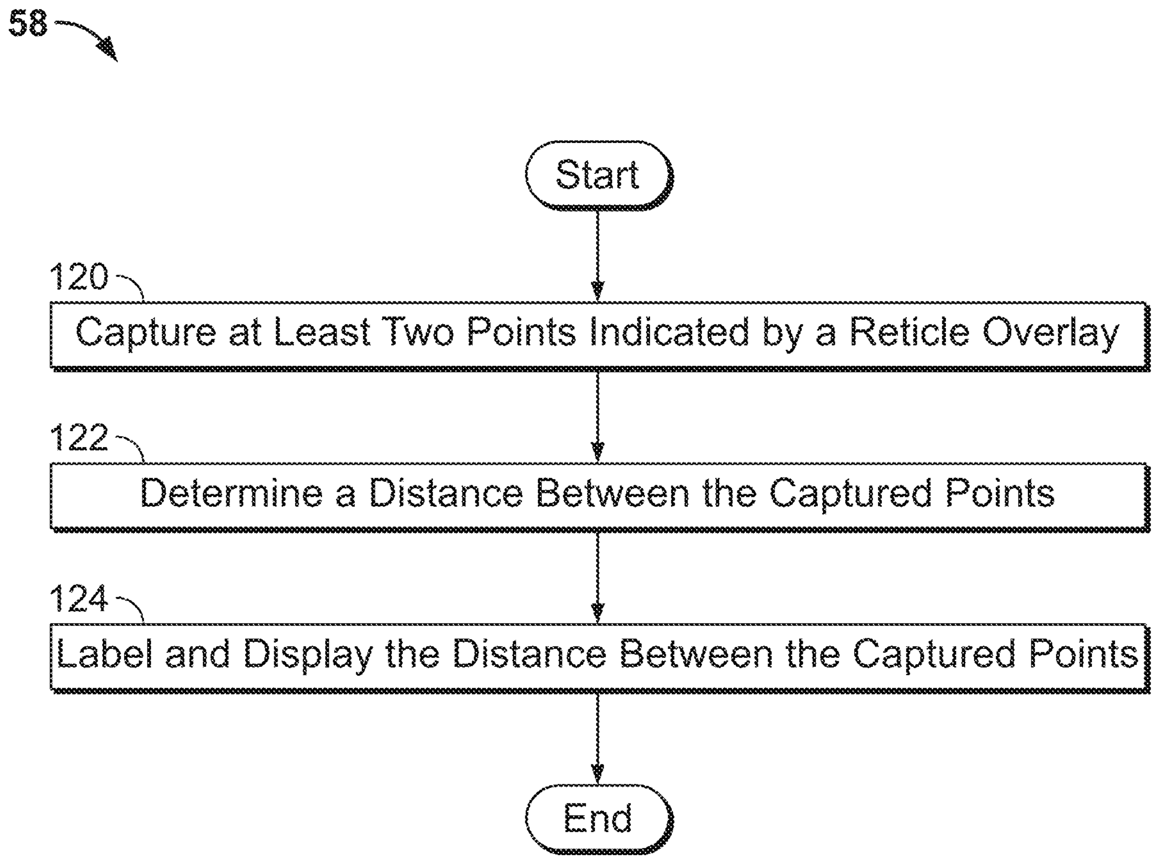
FIGS. 4A-4C are flowcharts illustrating embodiments of step 58 in greater detail.
Figure 4B:
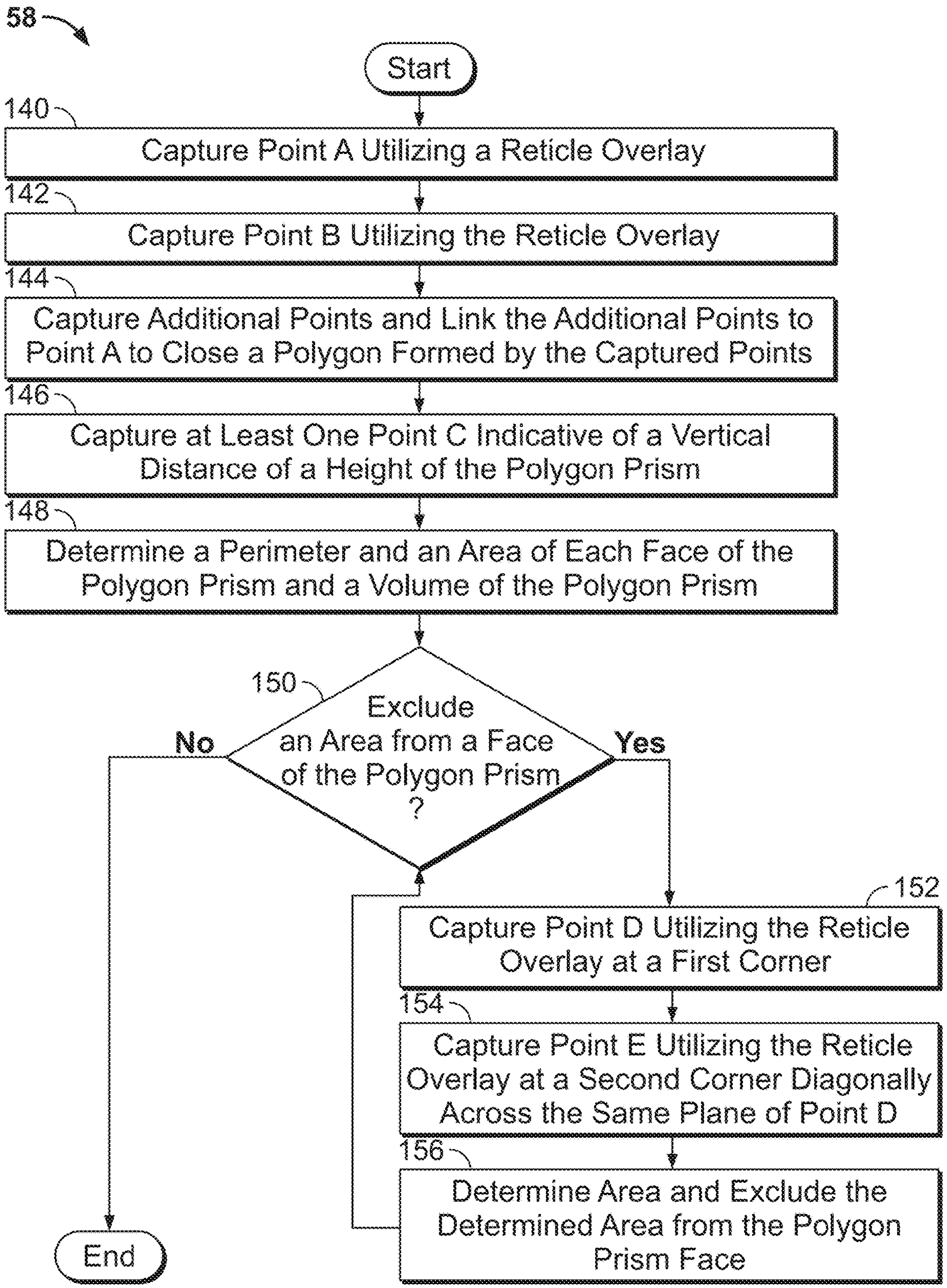
Figure 4C:
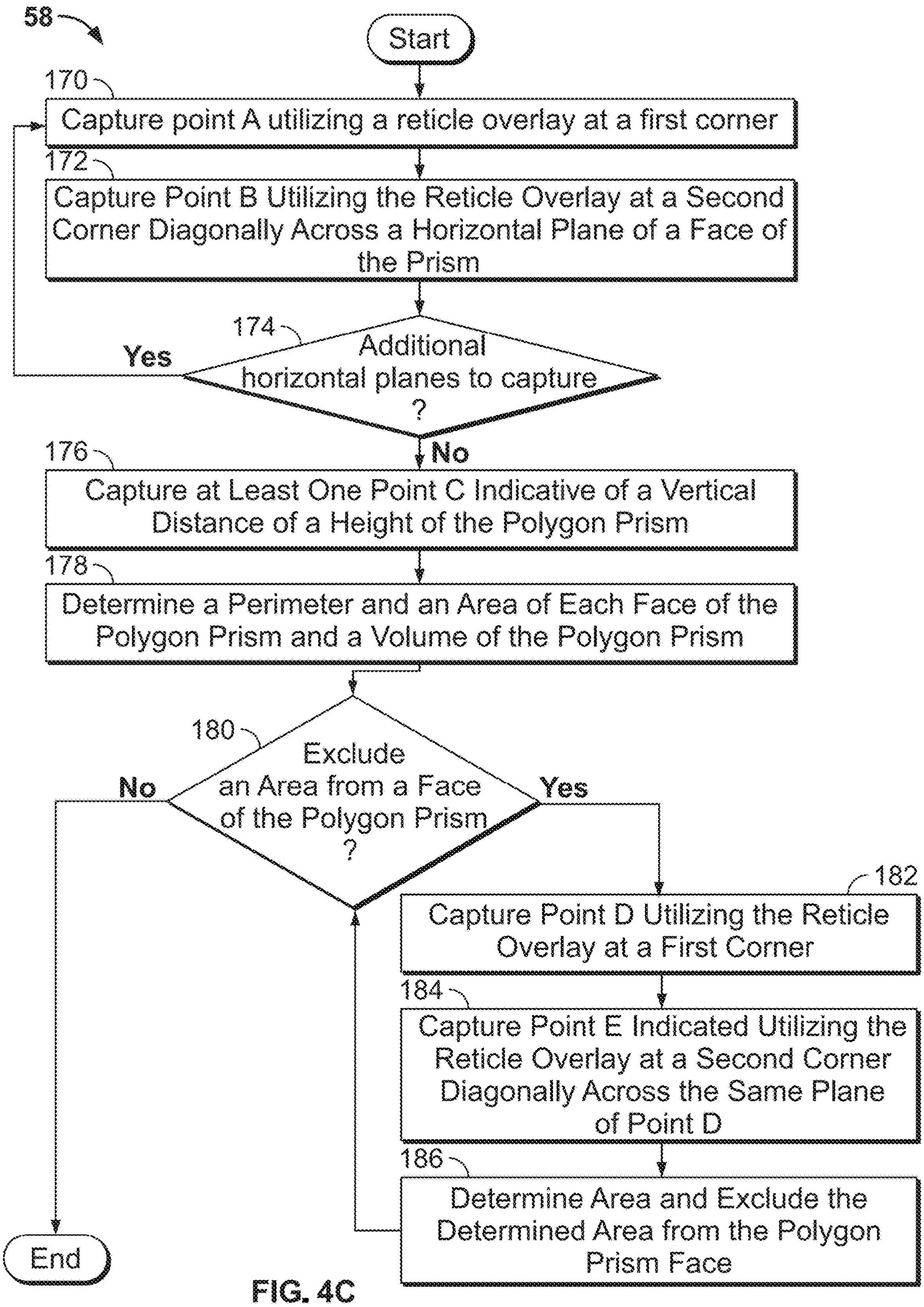

FIGS. 4A-4C are flowcharts illustrating embodiments of step 58 in greater detail. As mentioned above, the system 10 can receive a measurement tool selection from the first user 11 or the second user 18 to measure an object and/or feature present in the scene displayed on the display of the mobile device 12 of the first user 11 where the measurement tool can be a line segment tool, line polygon prism tool, a rectangle polygon prism tool, or any other tool. Accordingly, FIGS. 4A-4C respectively illustrate processing steps carried out by the system 10 for measuring a specific object and/or feature of a structure based on a received measurement tool selection.

FIG. 4A illustrates processing steps carried out by the system 10 for measuring a specific object and/or feature of a structure via a line segment tool. In step 120, the system 10 positions and captures at least two points indicated by a reticle overlay based on an input from the first user 11 or the second user 18. In particular, the system 10 positions a first point onto the augmented reality scene based on points of a detected vertical or horizontal plane as described above in relation to FIG. 3. As described below, the system 10 can generate an orthogonal guideline to measure a point (e.g., a second point) in a direction normal to a surface (e.g., a surface having the first point). The system 10 can position a second point in the same way, be it on the orthogonal guideline, on another plane or another point. It should be understood that the system 10 can discard a captured point based on an input from the first user 11 or the second user 18. It should also be understood that the system 10 can carry out a plurality of operations to position and capture a point including, but not limited to, snapping to a point, snapping to the orthogonal guideline, snapping to a plane on the orthogonal guideline, and extending a measurement along the orthogonal guideline as described in further detail below.

The system 10 can snap to a point by executing a raycast hit test originating from a center of the display of the mobile device 12. If an existing point on the detected plane is hit (contacted), then the system 10 can update a world position (e.g., a position relative to the scene's world coordinate space) of the reticle overlay to be the world position of the existing point. If an existing point is not hit, the system 10 can update the world position of the reticle overlay to a position where a raycast hit test originating from the center of the display of the mobile device 12 hits a plane. The system 10 can also snap to the orthogonal guideline by executing a raycast hit test originating from a center of the display of the mobile device 12. The orthogonal guideline can be defined by a collision shape (e.g., planes, spheres, boxes, cylinders, convex hulls, ellipsoids, compounds, arbitrary shapes, or any suitable shape defining the orthogonal guideline). The collision shape can be hit by casted rays. If a collision shape of the orthogonal guideline is hit, the system 10 can utilize the hit position and project it onto a vector indicative of a direction of the orthogonal guideline as well as update a position of the reticle overlay to be the hit position adjusted to the orthogonal guideline direction. If the guideline collision shape is not hit, the system 10 can update a position of the reticle to a position where a center of the display raycast hits a plane.

Additionally, the system 10 can snap to a plane on an orthogonal guideline. In particular, when the reticle is snapped to the orthogonal guideline the system 10 can execute a raycast hit test with the origin set to the reticle position (e.g., a position of the reticle overly on the orthogonal guideline) and the direction set to the orthogonal guideline direction. If a plane is hit, the system 10 can determine a distance from the reticle to a plane hit position and if the distance is within a "snap range" (e.g., a predetermined centimeter threshold), the system 10 can update the reticle position to the plane hit position. If a plane is not hit, the system 10 can execute a raycast hit test with the origin set to the reticle position and the direction set to the negated orthogonal guideline direction. If a plane is hit, the system 10 can determine a distance from the reticle to a plane hit position and if the distance is within the "snap range" the system 10 can update the reticle position to the plane hit position. If a plane is not hit in the negated orthogonal guideline direction, the system 10 can maintain a position of the reticle on the guideline. The system 10 can execute the aforementioned raycast hit tests with each new position of the reticle.

The system 10 can also extend a measurement along the orthogonal line. When an initial measurement is positioned along an orthogonal guideline, a second point of the initial measurement becomes oriented along the directional vector of the orthogonal guideline. If a new measurement is started from the initial measurement's second point, the orthogonal guideline uses that point's orientation to extend along the same directional vector. The new measurement can then be completed along the guideline making it collinear with the initial measurement.

It should be understood that the system 10 allows the second user 18 to remotely position a point on the augmented reality scene. In particular, the second user 18 and/or the remote device 16 can transmit a signal via a video client's server to the first user 11 and/or the mobile device 12 requesting that the first user 11 and/or the mobile device 12 add a measurement point. The first user 11 and/or the mobile device 12 receives this signal and executes the operation to add a measurement point on behalf of the second user 18. This signal transmission can also be utilized to remotely initiate and close a measurement tool, select the type of measurement to be conducted, change a unit of measurement, and modify or discard a captured point.

In step 122, the system 10 determines a distance between the captured points. In particular, the system can determine the distance between two points by applying a distance formula from the three-dimensional coordinates of each point. In step 124, the system 10 labels and displays the determined distance between the captured points. It should be understood that the system 10 can carry out different operations for labeling and displaying the determined distance between two points based on an operating system executing on the mobile device 12.

For example, if iOS is executing on the mobile device 12, then the distance for the line measurement is displayed in a label using shape and label nodes form the Apple SpriteKit library. When a line measurement is pending (indicated by a solid line or a dashed line) the measurement label is positioned on the guideline no greater than four times the label's width from the reticle, or it is positioned above the reticle, thus keeping the line measurement visible on the screen until the line measurement is complete. Once a line measurement is complete a solid line is placed between the two points in two-dimensional space. When the line measurement is complete the label is positioned at a midpoint of the line in three-dimensional space, with the midpoint determined by using a midpoint segment formula. Measurements can be displayed in feet and inches or meters and/or centimeters, depending on the region settings of the mobile device 11 or the configuration override set in a menu on the system 10.

In another example, if Android is executing on the mobile device 12, then the system 10 can create a view that can be rendered in three-dimensional space, called a label, that displays a distance of the line measurement. When a line measurement is pending (indicated by a solid line or a dashed line) the label is displayed and positioned no further away from the reticle than a defined maximum distance that maintains the label visible while the line measurement is pending. On every frame, rotation, size, and position adjustments are required. For rotation adjustments, the system 10 aligns the label's up vector with the up vector of the camera of the mobile device 11 and subsequently aligns the label's forward vector with its screen point ray vector, thereby maintaining the label facing the camera and tilting with the camera. For size adjustments, the system 10 adjusts the label's size to be proportional to a base height and the distance from the camera. As the camera moves further away from a completed line measurement, the label will increase in size. Once a line measurement is complete a solid line is placed between the two points in three-dimensional space. When the line measurement is complete the label is positioned at the x, y, z coordinates that lie in the center between the start and end points of the line measurement. On every frame, the rotation, size, and position adjustments are made.

In some embodiments, the system 10 can extend a measurement along a different orthogonal guideline. The system 10 can generate a new orthogonal guideline that is titled relative to a previous orthogonal guideline. For example, there is a non-zero angle between the new orthogonal guideline and the previous orthogonal guideline. A new measurement can be started from the previous measurement along the new orthogonal guideline. For example, the system 10 can capture a third point along the new orthogonal guideline. The system 10 can calculate a distance between the second and third points. The system 10 can label and display the distance between the second and third points. An example is further described in FIG. 8.

FIG. 4B illustrates processing steps carried out by the system 10 for measuring specific objects or features of a structure via a line polygon prism tool. In step 140, the system 10 captures a point A utilizing a reticle overlay, and in step 142, the system 10 captures a point B utilizing the reticle overlay. It should be understood that the system 10 captures points based on an input from the first user 11 or the second user 18. The reticle can be defined by a formation of three line segments oriented along the local x-axis, y-axis, and z-axis, centered about its origin. The system 10 can place and orient the reticle by executing a raycast originating from a center of the display of the mobile device 12 onto an augmented reality scene and positioning the reticle on a ground plane at the position of the raycast result. The reticle can be oriented to face a camera view of the mobile device 12. This process can be repeated on every frame such that the reticle remains centered on the display of the mobile device 12 as the first user 11 moves about a physical space.

In step 144, the system captures additional points and links the additional points to point A to close a polygon formed by point A, point B, and the additional points. In step 146, the system 10 captures a point C indicative of a vertical distance of a height of the polygon prism. Then, in step 148, the system 10 determines geometrical parameters of the polygon prism, such as a perimeter and an area of each face of the polygon prism and a volume of the polygon prism. For example and with respect to a rectangular measurement, the system 10 determines a perimeter of a rectangular plane by applying a perimeter formula of a rectangle and determines an area of the rectangular plane by applying an area formula of a rectangle. Additionally, it should be understood that the system 10 can optionally merge coplanar polygons where a polygon refers to a closed, non-self-intersecting path formed by an ordered list of coplanar vertices. The system 10 can merge two polygons by positioning a first polygon on a ground plane, positioning a second polygon on the ground plane such that it overlaps with the first polygon, and determining a union between the first and second polygons. The system 10 can merge an additional polygon by determining a union between the additional polygon and the merged first and second polygons. In this way, the system 10 can merge any number of polygons. The system 10 can remove a section from the first polygon, or merged polygons, by creating a polygon within the interior of the existing polygon where at least one side of the polygon snaps to the perimeter of the existing polygon and no side of the additional polygon extends beyond the perimeter of the existing polygon. A line tool can create a face of the polygon that is not 90 degrees by marking a point on one face of the polygon and marking another point on a different face of the polygon. With this combination of tools a polygon with varying shapes can be created.

In step 150, the system 10 determines whether to exclude an area from a face of the polygon prism. If the system 10 determines not to exclude an area from a face of the polygon prism, then the process ends. Alternatively, if the system 10 determines to exclude an area from a face of the polygon prism, then the process proceeds to step 152. In step 152, the system 10 captures a point D utilizing the reticle overlay at a first corner. Then, in step 154, the system 10 captures a point E utilizing the reticle overlay at a second corner diagonally across the same plane of point D. In step 156, the system 10 determines the area bounded by the points and excludes the determined area from the polygon prism face and subsequently the process returns to step 150.

FIG. 4C illustrates processing steps carried out by the system 10 for measuring specific objects or features of a structure via a rectangle polygon prism tool. In step 170, the system 10 captures a point A utilizing a reticle overlay at a first corner, and in step 172, the system 10 captures a point B utilizing the reticle overlay at a second corner diagonally across a horizontal plane of a face of the prism. It should be understood that the system 10 captures points based on an input from the first user 11 or the second user 18. As mentioned above, the reticle can be defined by a formation of three line segments oriented along the local x-axis, y-axis, and z-axis, centered about its origin and can be positioned and oriented by executing a raycast originating from a center of the display of the mobile device 12 onto an augmented reality scene. In particular, steps 170 and 172 relate to a rectangular measurement. The system 10 positions a first vertex on a first corner of a detected floor plane and a second vertex on a second corner of the floor plane and locks an orientation of the reticles and utilizes the orientation of the reticles as local coordinate system's origin. From these two vertices, a rectangular plane can be drawn. The system 10 determines a center of the rectangular plane from a midpoint between the two vertices. The system 10 determines a width of the rectangular plane from the x-component of the second vertex and a length of the rectangular plane from the y-component of the second vertex.

In step 174, the system 10 determines whether there are additional horizontal planes to capture. If the system 10 determines that there are additional horizontal planes to capture, then the process returns to step 170. Alternatively, if the system 10 determines that there are not additional horizontal planes to capture, then the process proceeds to step 176. In step 176, the system 10 captures at least one point C indicative of a vertical distance of a height of the polygon prism. It should be understood that the system 10 can carry out different operations for vertical and/or horizontal plane snapping based on an operating system executing on the mobile device 12.

For example, if an iOS operating system is executing on the mobile device 12, then when a vertical plane is detected the system 10 can extend a bounding box thereof to increase a likelihood of plane intersections to facilitate hit testing. Once the reticle is positioned on a ground plane, the system 10 can execute a hit test along an x-axis line segment and a z-axis line segment of the reticle. If the system 10 detects a vertical plane, then the system 10 can position the reticle at the position of the hit test and orient the reticle along a surface of the detected vertical plane. The system 10 can execute another hit test along the line segment that is oriented along the surface of the first detected plane to detect if the reticle intersects with a second plane. If the system 10 detects a second plane, then the system 10 can position the reticle at the position of the resulting hit test.

In another example, if Android operating system is executing on the mobile device 12, then the system 10 determines all lines in three-dimensional space where horizontal and vertical planes intersect and adds a guideline at each of the intersections with a collision box that is larger than the actual rendered guideline. Then, the system 10 executes a raycast hit test from a center of the display of the mobile device 12. If a result of the raycast hits the guideline, then the system 10 can snap to a corresponding position on the horizontal plane where the planes intersect.

Then, in step 178, the system 10 determines a perimeter and an area of each face of the polygon prism and a volume of the polygon prism. For example and with respect to a rectangular measurement, the system 10 determines a perimeter of a rectangular plane by applying a perimeter formula of a rectangle and determines an area of the rectangular plane by applying an area formula of a rectangle. Additionally, it should be understood that the system 10 can optionally merge coplanar polygons where a polygon refers to a closed, non-self-intersecting path formed by an ordered list of coplanar vertices. The system 10 can merge two polygons by positioning a first polygon on a ground plane, positioning a second polygon on the ground plane such that it overlaps with the first polygon, and determining a union between the first and second polygons. The system 10 can merge an additional polygon by determining a union between the additional polygon and the merged first and second polygons. In this way, the system 10 can merge any number of polygons. The system 10 can remove a section from the first polygon, or merged polygons, by creating a polygon within the interior of the existing polygon where at least one side of the polygon snaps to the perimeter of the existing polygon and no side of the additional polygon extends beyond the perimeter of the existing polygon. A line tool can create a face of the polygon that is not 90 degrees by marking a point on one face of the polygon and marking another point on a different face of the polygon. With this combination of tools a polygon with varying shapes can be created.

In step 180, the system 10 determines whether to exclude an area from a face of the polygon prism. Alternatively, the first user 11 or the second user 18 can determine whether to exclude an area from a face of the polygon prism. If the system 10 (or, the users 11 or 18) determines not to exclude an area from a face of the polygon prism, then the process ends. Alternatively, if the system 10 determines to exclude an area from a face of the polygon prism, then the process proceeds to step 182. In step 182, the system 10 captures a point D utilizing the reticle overlay at a fourth corner. Then, in step 184, the system 10 captures a point E utilizing the reticle overlay at a fifth corner diagonally across the same plane of point D. In step 186, the system 10 determines the area bounded by the points and excludes the determined area from the polygon prism face and subsequently the process returns to step 180.

Figure 5:
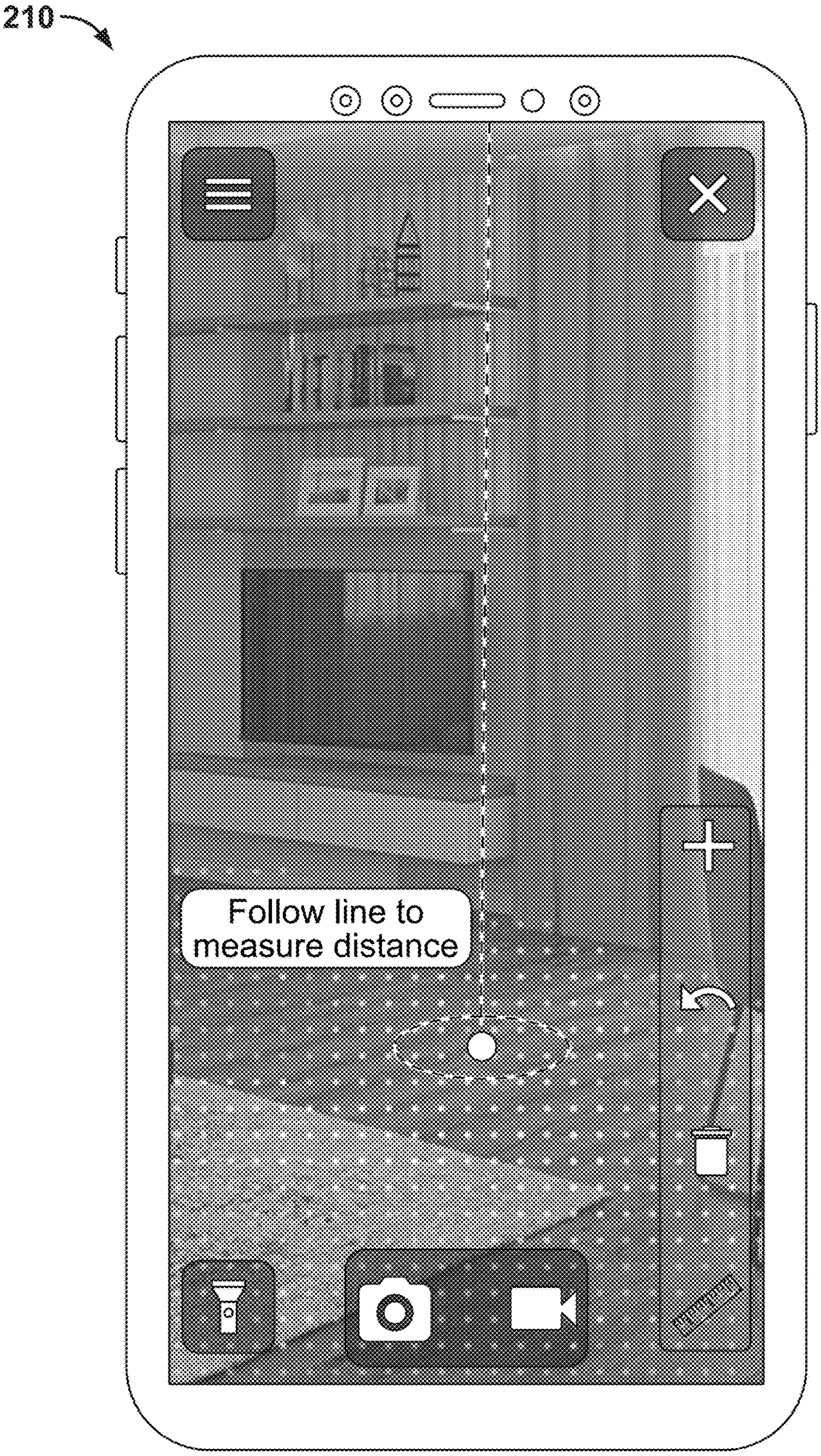
FIGS. 5-11 are screenshots illustrating operation of the system of the present disclosure.
Figure 6:
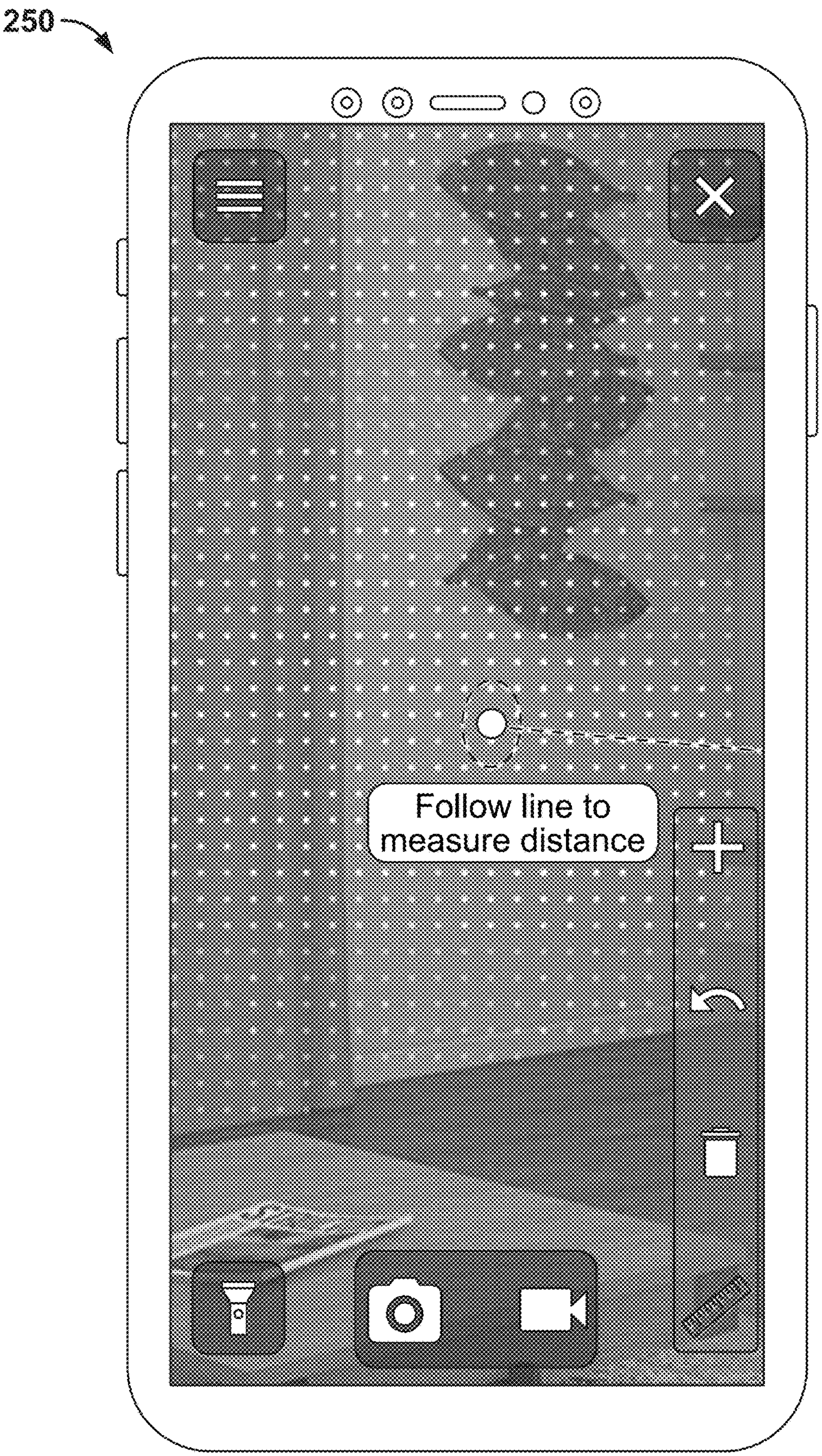
Figure 7:
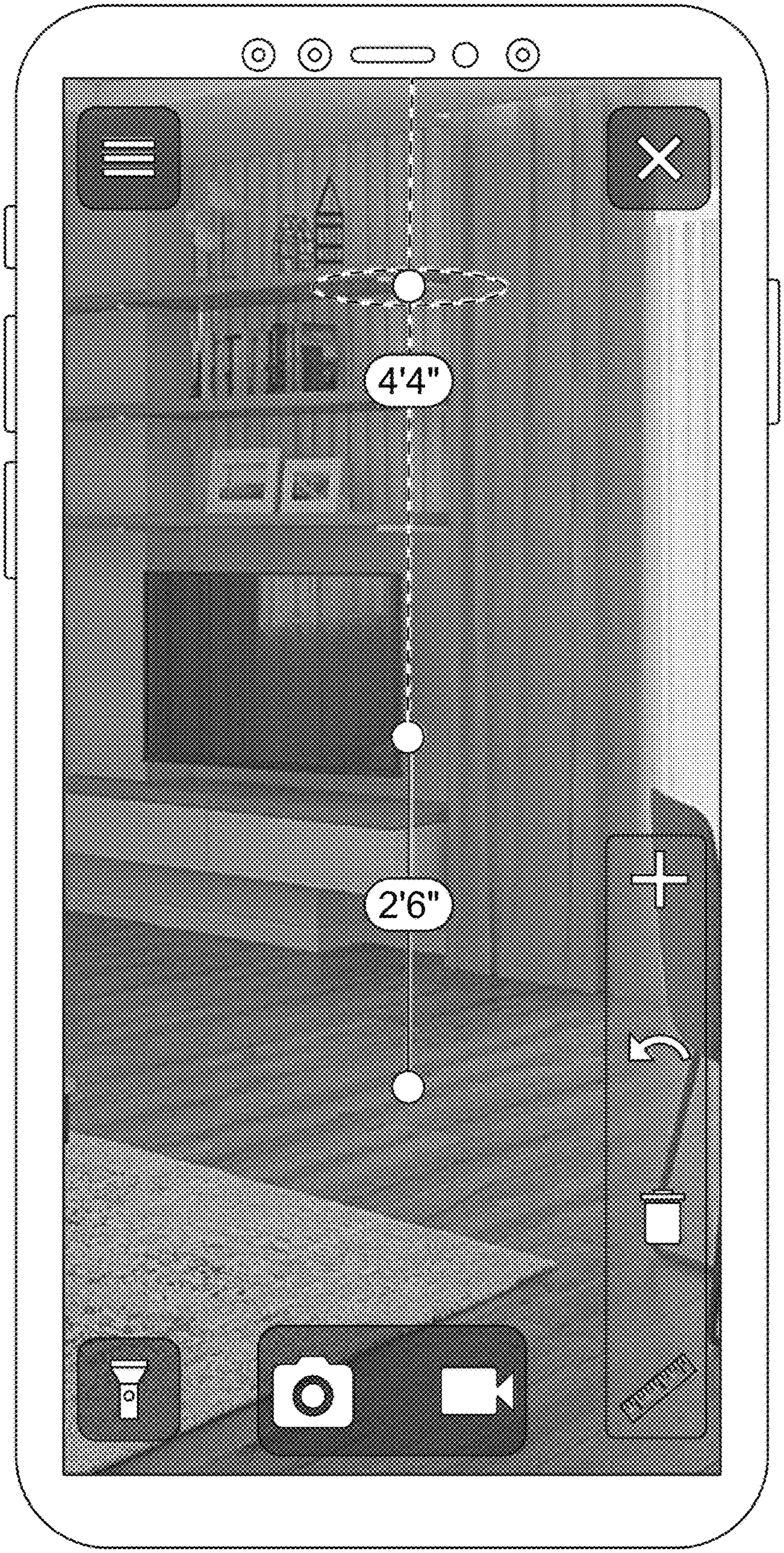
Figure 8:
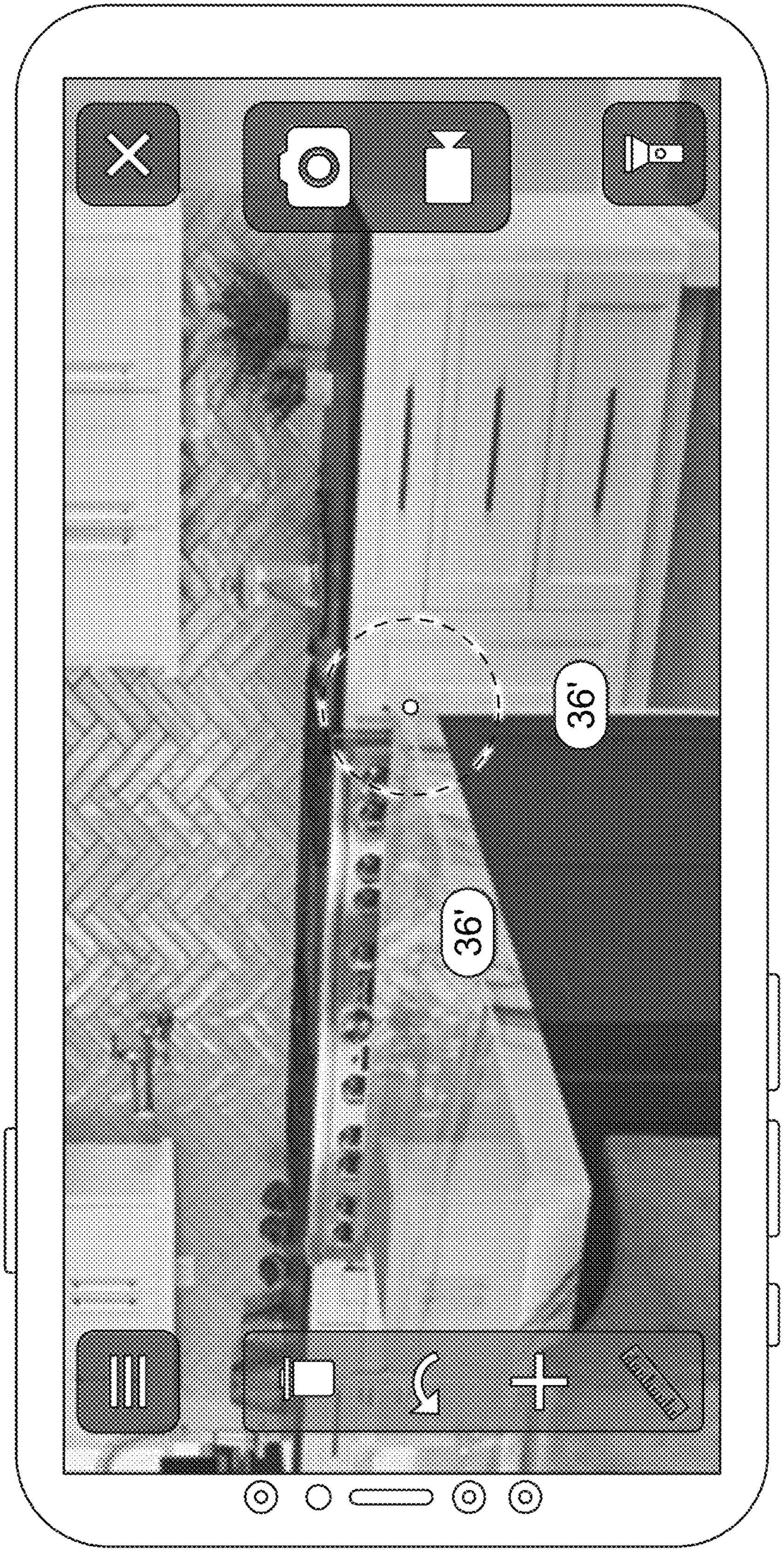

FIGS. 5-11 are screenshots illustrating operation of the system of the present disclosure. In particular, FIG. 5 is a screenshot 210 of a display of the mobile device 12 illustrating horizontal plane detection, positioning and capturing of a point based on the detected horizontal plane, and generating and displaying an orthogonal guideline from the captured point. FIG. 6 is a screenshot 250 of a display of the mobile device 12 illustrating vertical plane detection, positioning and capturing of a point based on the detected vertical plane, and generating and displaying an orthogonal guideline from the captured point. Measurements can be made using the captured points. FIG. 7 is a screenshot 270 of a display of the mobile device 12 illustrating a measurement of a first line segment along an orthogonal guideline, a label of the measurement of the first line segment, and a measurement of a second line segment adjacent to the first line segment and along the orthogonal guideline. FIG. 8 is a screenshot 300 of a display of the mobile device 12 illustrating a labeled measurement of a first line segment along a width of a kitchen island and a labeled measurement of a second line segment along a height of the kitchen island where respective points of the first and second line segments are snapped in position.

Figure 9:
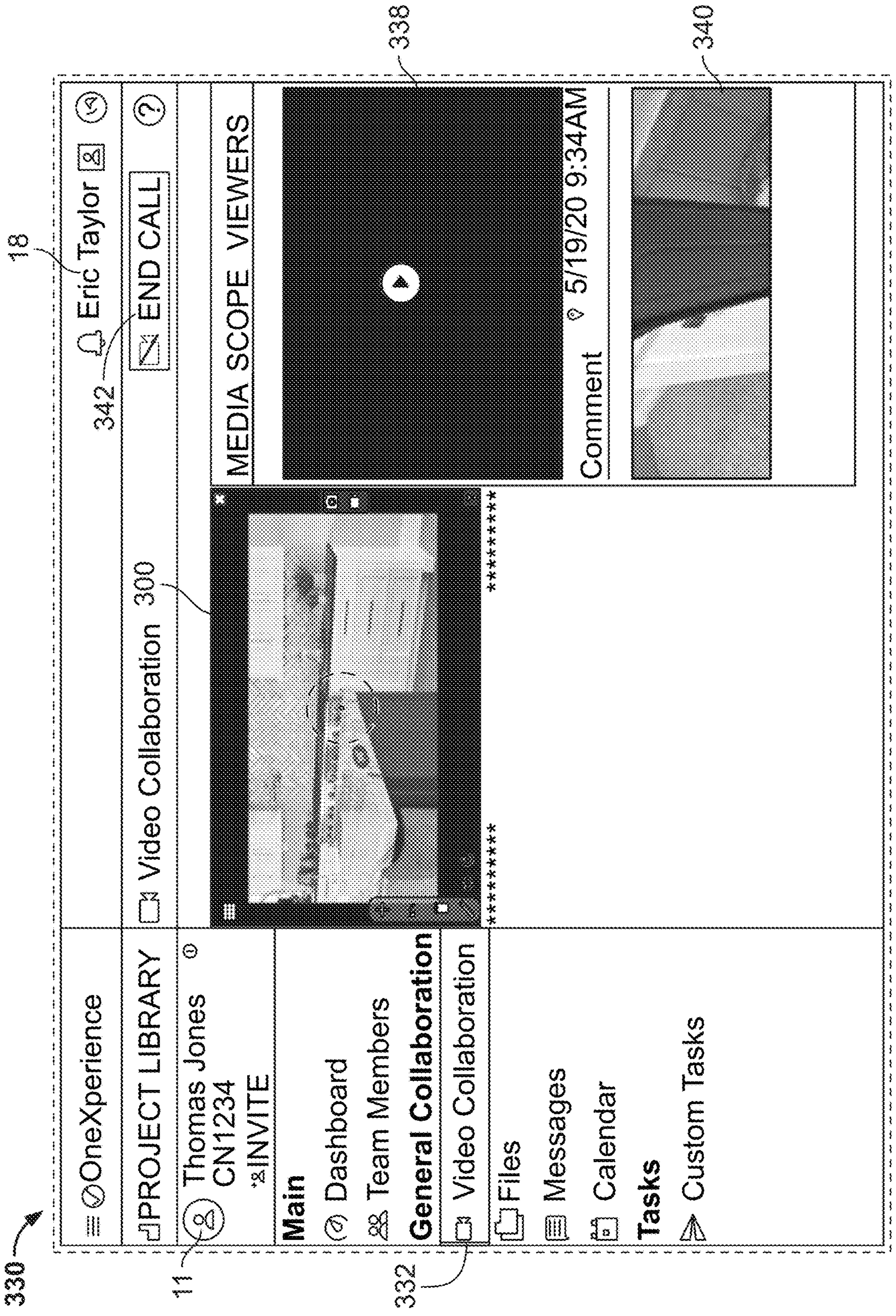

FIG. 9 is a screenshot 330 of a display of the mobile device 12 illustrating transmission of an augmented reality view to a second user 18 and measurements executed remotely by the second user 18. As mentioned above, the system 10 can establish an audio and video connection 300 between the mobile device 12 of the first user 11 and the remote device 16 of the second user 18 such that the second user 18 can view a scene (e.g., an augmented reality view) displayed on a display of the mobile device 12 of the first user 11, in the display screens 300, 338, and 340 shown in FIG. 9. For example, the system 10 can capture a current frame of an augmented reality view displayed on the display of the mobile device 12 as an image, convert the image to a pixel buffer, and transmit the pixel buffer to the remote device 16 utilizing a video client SDK. This transmission occurs several times per second thereby yielding a live video stream of the local augmented reality view displayed on the display of the mobile device 12.

As shown in FIG. 9, a first user 11 (e.g., Thomas Jones) can share an A/V connection with a second user 18 (e.g., Eric Taylor) via a video collaboration portal 332. As such, the second user 18 can view augmented reality views 300, 338 and 340 as displayed on a display of the mobile device 12 of the first user 11 and remotely execute measurements of an object or feature present in the augmented reality views 300, 338 and 340. The system 10 can transmit these measurements to the server 14. It should be understood that the first user 11 or the second user 18 can terminate the shared A/V connection. For example, the first user 11 can terminate the shared A/V connection from the mobile device 12 or the second user 18 can terminate the shared A/V connection from the video collaboration portal 332 by selecting the end call button 342. The measurements transmitted to the server 14 are accessible to the second user 18 after termination of the A/V connection.

Figure 10:
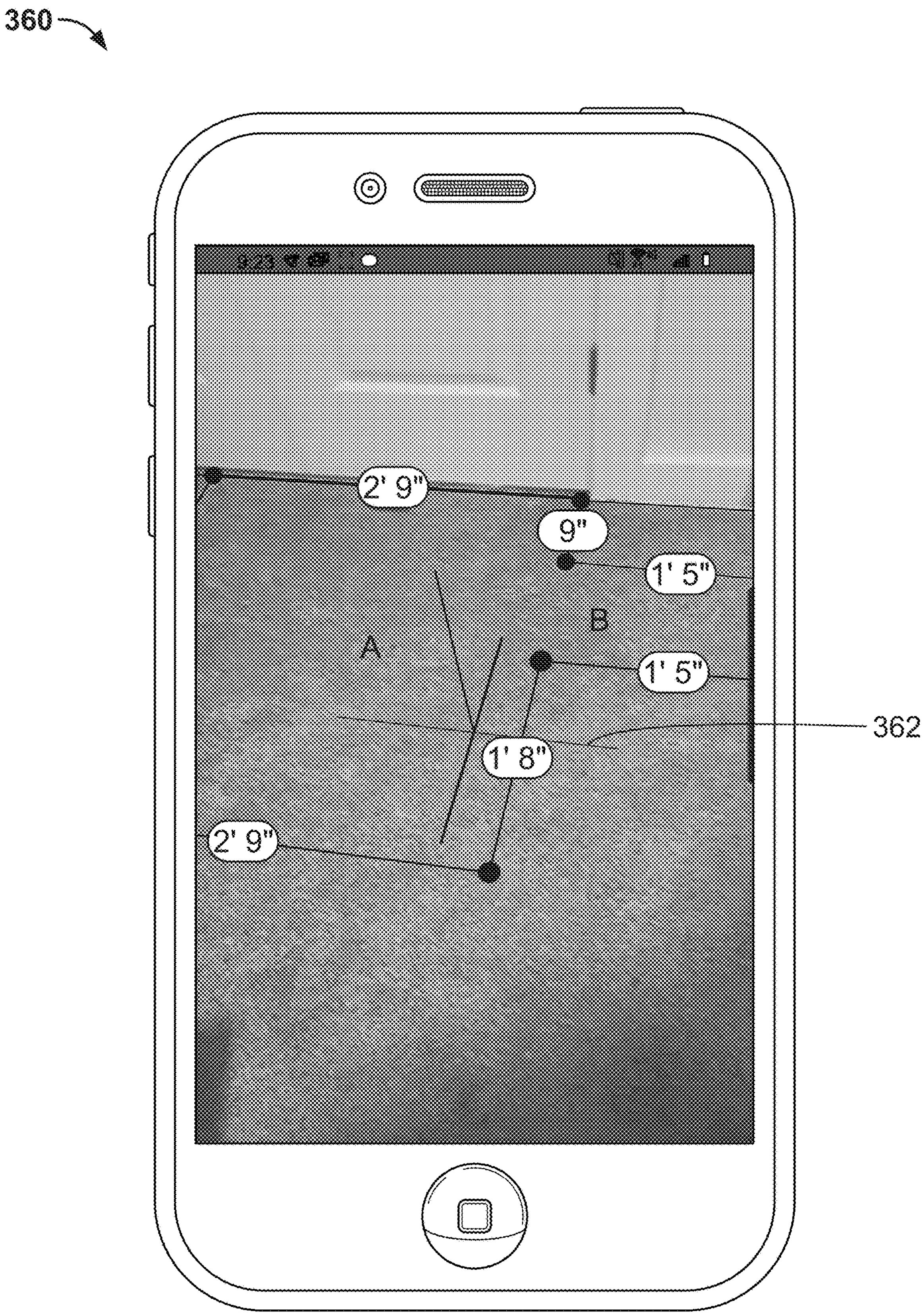

FIG. 10 is a screenshot 360 of a display of the mobile device 12 illustrating reticle placement and orientation for room measurements and rectangular measurements and merging coplanar polygons. As shown in FIG. 10, the reticle 362 is placed in a center of a ground plane and coplanar polygons A and B are merged along an adjacent side. As can be seen, using these tools, accurate floor measurements and floor plans can be generated.

Figure 11:
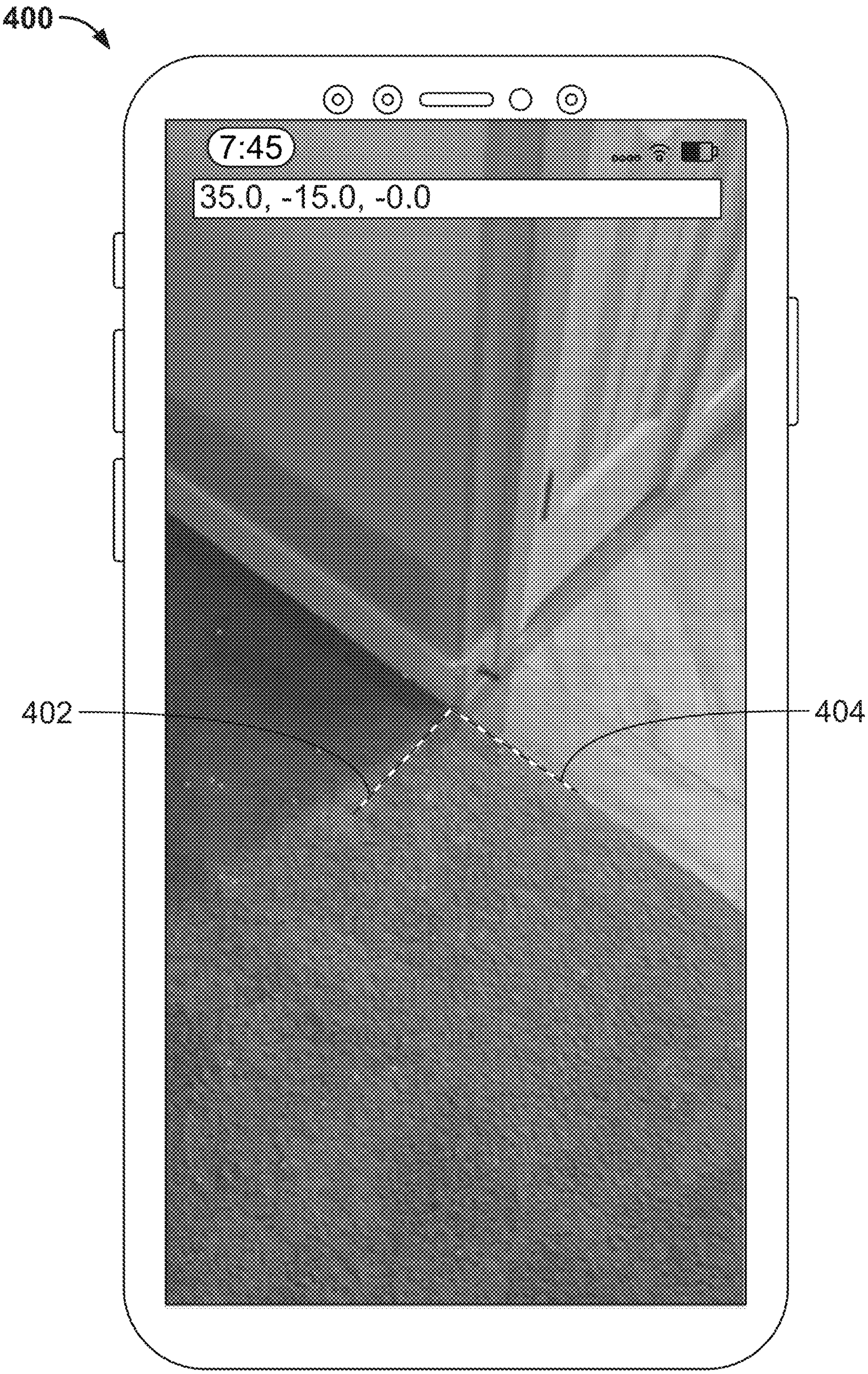

FIG. 11 is a screenshot 400 of a display of the mobile device 12 illustrating reticle placement and orientation for vertical plane snapping, using tools 402 and 404.

It is noted that the augmented reality scene disclosed herein can be displayed by either, or both, of the mobile device (e.g., of the first user) and the remote device (e.g., of the second user). Moreover, the various tools and processes disclosed herein could also be accessed, utilized, and/or executed by either, or both, of the mobile device and the remote device, thus permitting flexible augmented reality visualization and collaboration using either, or both, of the devices.

FIG. 12 a diagram illustrating another embodiment of the system 500 of the present disclosure. In particular, FIG. 12 illustrates additional computer hardware and network components on which the system 500 could be implemented. The system 500 can include a plurality of computation servers 502*a*-502*n* having at least one processor and memory for executing the computer instructions and methods described above (which could be embodied as system code 20). The system 500 can also include a plurality of image storage servers 504*a*-504*n* for receiving image data and/or video data. The system 500 can also include a plurality of camera devices 506*a*-506*n* for capturing image data and/or video data. For example, the camera devices can include, but are not limited to, a personal digital assistant 506*a*, a tablet 506*b* and a smart phone 506*n*. The computation servers 502*a*-502*n*, the image storage servers 504*a*-504*n*, the camera devices 506*a*-506*n*, and the remote device 16 can communicate over a communication network 508. Of course, the system 500 need not be implemented on multiple devices, and indeed, the system 500 could be implemented on a single computer system (e.g., a personal computer, server, mobile computer, smart phone, etc.) without departing from the spirit or scope of the present disclosure.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected by Letters Patent is set forth in the following Claims.

The invention claimed is:

1. A collaborative augmented reality system for measuring objects, comprising:

a memory; and a processor in communication with the memory, the processor:

establishing an audio and video connection between a mobile device of a first user and a remote device of a second user, whereby the first user can view an augmented reality scene displayed on a display of the mobile device of the first user and the augmented reality scene is transmitted to and displayed on the remote device of the second user, the first user and the second user being able to collaboratively measure an object or a feature of a structure depicted in the augmented reality scene;

receiving a measurement tool selection to measure an object or feature present in the scene displayed on the display;

detecting a plane for the scene displayed on the display;

determining a measurement of the object or feature based on the received measurement tool selection; and transmitting the measurement of the object or feature to a server, wherein the processor detects the plane for the scene by:

executing a first raycast originating from a center of the display to detect a vertical or horizontal plane; and determining whether a vertical or horizontal plane is detected, and wherein the processor further performs the steps of:

determining that no vertical or horizontal planes are detected;

executing a second raycast originating from the center of the display to detect an infinite horizontal plane; and determining whether an infinite horizontal plane is detected.

2. The system of claim 1, wherein the processor further performs the steps of:

determining that one or more infinite horizontal planes are detected; and selecting a farthest infinite horizontal plane relative to the center of the display.

3. The system of claim 1, wherein the processor further performs the steps of:

determining that no infinite horizontal planes are detected;

executing a third raycast originating from the center of the display to detect an infinite vertical plane; and selecting a nearest detected infinite vertical plane relative to the center of the display based on determining that one or more infinite vertical planes are detected.

4. The system of claim 1, wherein the processor detects the plane for the scene based on an operating system.

5. The system of claim 1, wherein the processor determines the measurement of the object or feature by:

capturing at least two points indicated by a reticle overlay, wherein the at least two points are associated with the object or feature;

determining a distance between the captured points; and labeling and displaying the determined distance between the captured points.

6. The system of claim 5, wherein the processor captures the at least two points by:

positioning a first point onto the augmented realty scene based on points of the detected plane;

generating an orthogonal guideline to measure a second point in a direction normal to a surface having the first point; and positioning a second point based on the orthogonal guideline.

7. The system of claim 6, wherein the processor further performs the steps of:

generating an additional orthogonal guideline based on the second point, wherein the additional orthogonal guideline is tilted relative to the orthogonal guideline;

positioning a third point along the additional orthogonal guideline;

determining a distance between the second and third points; and labeling and displaying the determined distance between the second and third points.

8. The system of claim 5, wherein the processor captures the at least two points by:

snapping to a first point;

snapping to an orthogonal guideline to capture a second point;

snapping to a plane on the orthogonal guideline; and extending a first measurement along the orthogonal guideline to capture a second measurement starting from the second point, wherein the first measurement includes the first point and the second point.

9. The system of claim 8, wherein the processor snaps to the first point by:

executing a raycast hit test originating from the center of the display;

updating a world position of the reticle overlay to be a world position of an existing point on the detected plane based on determining that the raycast hit test hits the existing point; or updating a world position of the reticle overlay to a position where the raycast hit test hits a plane based on determining that no existing point on the detected plane is hit, wherein the updated world position of the reticle overlay is indicative of a position of the first point.

10. The system of claim 8, wherein the processor extends the first measurement along the orthogonal guideline to capture the second measurement starting from the second point by capturing a third point along the orthogonal guideline, wherein the first measurement and the second measurement are collinear.

11. The system of claim 1, wherein the augmented reality scene includes at least one augmented reality measurement tool accessible by the first and second users of the augmented reality scene to collaboratively measure the object depicted in the augmented reality scene.

12. A computer-implemented method for collaborative augmented reality measurements, comprising:

establishing an audio and visual connection between a mobile device of a first user and a remote device of a second user, whereby the first user can view an augmented reality scene displayed on a display of the mobile device of the first user and the augmented reality scene is transmitted to and displayed on the remote device of the second user, the first user and the second user being able to collaboratively measure an object or a feature of a structure depicted in the augmented reality scene;

receiving a measurement tool selection to measure an object or feature present in the scene displayed on the display;

detecting a plane for the scene displayed on the display;

determining a measurement of the object or feature based on the received measurement tool selection; and transmitting the measurement of the object or feature to a server, wherein the step of detecting the plane for the scene comprises:

executing a first raycast originating from a center of the display to detect a vertical or horizontal plane;

determining whether a vertical or horizontal plane is detected;

determining that no vertical or horizontal planes are detected;

executing a second raycast originating from the center of the display to detect an infinite horizontal plane; and determining whether an infinite horizontal plane is detected.

13. The computer-implemented method of claim 12, further comprising:

determining that one or more infinite horizontal planes are detected; and selecting a farthest infinite horizontal plane relative to the center of the display.

14. The computer-implemented method of claim 12, further comprising:

determining that no infinite horizontal planes are detected;

executing a third raycast originating from the center of the display to detect an infinite vertical plane; and selecting a nearest detected infinite vertical plane relative to the center of the display based on determining that one or more infinite vertical planes are detected.

15. The computer-implemented method of claim 12, wherein detecting the plane for the scene is based on an operating system.

16. The computer-implemented method of claim 12, wherein the step of determining the measurement of the object or feature comprises:

capturing at least two points indicated by a reticle overlay, wherein the at least two points are associated with the object or feature;

determining a distance between the captured points; and labeling and displaying the determined distance between the captured points.

17. The computer-implemented method of claim 16, wherein the step of capturing the at least two points comprises:

positioning a first point onto the augmented realty scene based on points of the detected plane;

generating an orthogonal guideline to measure a second point in a direction normal to a surface having the first point; and positioning a second point based on the orthogonal guideline.

18. The computer-implemented method of claim 17, further comprising:

generating an additional orthogonal guideline based on the second point, wherein the additional orthogonal guideline is tilted relative to the orthogonal guideline;

positioning a third point along the additional orthogonal guideline;

determining a distance between the second and third points; and labeling and displaying the determined distance between the second and third points.

19. The computer-implemented method of claim 16, wherein the processor captures the at least two points by:

snapping to a first point;

snapping to an orthogonal guideline to capture a second point;

snapping to a plane on the orthogonal guideline; and extending a first measurement along the orthogonal guideline to capture a second measurement starting from the second point, wherein the first measurement includes the first point and the second point.

20. The computer-implemented method of claim 19, wherein the step of snapping to the first point comprises:

executing a raycast hit test originating from the center of the display;

updating a world position of the reticle overlay to be a world position of an existing point on the detected plane based on determining that the raycast hit test hits the existing point; or updating a world position of the reticle overlay to a position where the raycast hit test hits a plane based on determining that no existing point on the detected plane is hit, wherein the updated world position of the reticle overlay is indicative of a position of the first point.

21. The computer-implemented method of claim 19, wherein the step of extending the first measurement along the orthogonal guideline to capture the second measurement starting from the second point comprises capturing a third point along the orthogonal guideline, wherein the first measurement and the second measurement are collinear.

22. The computer-implemented method of claim 12, wherein the step of determining the measurement of the object or feature comprises:

capturing a first point using a reticle overlay;

capturing a second point using the reticle overlay;

capturing one or more points and linking the one or more points to the first point to close a polygon formed by the first point, the second point, and the one or more points, wherein the polygon is associated with the object or feature;

capturing a third point indicative of a vertical distance of a height of a polygon or a polygon prism formed at least by the polygon; and determining geometrical parameters of the polygon or the polygon prism.

23. The computer-implemented method of claim 22, further comprising:

determining to exclude an area from the polygon or from a face of the polygon prism;

capturing a fourth point using the reticle overlay at a first corner;

capturing a fifth point using the reticle overlay at a second corner diagonally across the same plane of the fourth point, wherein the first corner and the second corner are associated with the area to be excluded;

determining the area bounded by the fourth and fifth points; and excluding the determined area from the polygon or from the face of the polygon prism.

24. The computer-implemented method of claim 22, further comprising:

determining an additional polygon that is coplanar with the polygon; and determining a union between the polygon and additional polygon.

25. The computer-implemented method of claim 12, wherein the step of determining the measurement of the object or feature comprises:

capturing a first point using a reticle overlay at a first corner;

capturing a second point using the reticle overlay at a second corner diagonally across a horizontal plane of a face of a polygon prism, wherein the first corner and the second corner are associated with the object or feature; and determining whether there are additional horizontal planes to capture.

26. The computer-implemented method of claim 25, further comprising:

capturing a third point indicative of a vertical distance of a height of the polygon prism based on determining that there are not additional horizontal planes to capture; and determining geometrical parameters of the polygon prism.

27. The computer-implemented method of claim 26, further comprising:

determining to exclude an area from a face of the polygon prism;

capturing a fourth point using the reticle overlay at a fourth corner;

capturing a fifth point using the reticle overlay at a fifth corner diagonally across the same plane of the fourth point, wherein the fourth corner and the fifth corner are associated with the area to be excluded;

determining the area bounded by the fourth and fifth points; and excluding the determined area from the face of the polygon prism.

28. The method of claim 12, wherein the augmented reality scene includes at least one augmented reality measurement tool accessible by the first and second users of the augmented reality scene to collaboratively measure the object depicted in the augmented reality scene.

29. A collaborative augmented reality system for measuring objects, comprising:

a memory; and a processor in communication with the memory, the processor:

establishing an audio and video connection between a mobile device of a first user and a remote device of a second user, whereby the first user can view an augmented reality scene displayed on a display of the mobile device of the first user and the augmented reality scene is transmitted to and displayed on the remote device of the second user, the first user and the second user being able to collaboratively measure an object or a feature of a structure depicted in the augmented reality scene;

receiving a measurement tool selection to measure an object or feature present in the scene displayed on the display:

detecting a plane for the scene displayed on the display;

determining a measurement of the object or feature based on the received measurement tool selection; and transmitting the measurement of the object or feature to a server, wherein the processor determines the measurement of the object or feature by:

capturing a first point using a reticle overlay:

capturing a second point using the reticle overlay;

capturing one or more points and linking the one or more points to the first point to close a polygon formed by the first point, the second point, and the one or more points, wherein the polygon is associated with the object or feature;

capturing a third point indicative of a vertical distance of a height of a polygon or a polygon prism formed at least by the polygon; and determining geometrical parameters of the polygon or the polygon prism, and wherein the processor further performs the steps of:

determining to exclude an area from the polygon or from a face of the polygon prism;

capturing a fourth point using the reticle overlay at a first corner;

capturing a fifth point using the reticle overlay at a second corner diagonally across the same plane of the fourth point, wherein the first corner and the second corner are associated with the area to be excluded;

determining the area bounded by the fourth and fifth points; and excluding the determined area from the polygon or from the face of the polygon prism.

30. The system of claim 29, wherein the processor further performs the steps of:

determining an additional polygon that is coplanar with the polygon; and determining a union between the polygon and additional polygon.

31. The system of claim 29, wherein the processor further performs the steps of:

capturing the third point indicative of the vertical distance of the height of the polygon prism based on determining that there are not additional horizontal planes to capture; and determining geometrical parameters of the polygon prism.

32. The system of claim 31, wherein the processor further performs the steps of:

determining to exclude an area from a face of the polygon prism;

capturing a fourth point using the reticle overlay at a fourth corner;

capturing a fifth point using the reticle overlay at a fifth corner diagonally across the same plane of the fourth point, wherein the fourth corner and the fifth corner are associated with the area to be excluded;

determining the area bounded by the fourth and fifth points; and excluding the determined area from the face of the polygon prism.

33. A collaborative augmented reality system for measuring objects, comprising:

a memory; and a processor in communication with the memory, the processor:

establishing an audio and video connection between a mobile device of a first user and a remote device of a second user, whereby the first user can view an augmented reality scene displayed on a display of the mobile device of the first user and the augmented reality scene is transmitted to and displayed on the remote device of the second user, the first user and the second user being able to collaboratively measure an object or a feature of a structure depicted in the augmented reality scene;

receiving a measurement tool selection to measure an object or feature present in the scene displayed on the display;

detecting a plane for the scene displayed on the display;

determining a measurement of the object or feature based on the received measurement tool selection; and transmitting the measurement of the object or feature to a server, wherein the processor determines the measurement of the object or feature by:

capturing a first point using a reticle overlay at a first corner;

capturing a second point using the reticle overlay at a second corner diagonally across a horizontal plane of a face of a polygon prism, wherein the first corner and the second corner are associated with the object or feature; and determining whether there are additional horizontal planes to capture.

34. The system of claim 33, wherein the processor further performs the steps of:

determining that one or more infinite horizontal planes are detected; and selecting a farthest infinite horizontal plane relative to the center of the display.

35. The system of claim 33, wherein the processor further performs the steps of:

determining that no infinite horizontal planes are detected;

executing a third raycast originating from the center of the display to detect an infinite vertical plane; and selecting a nearest detected infinite vertical plane relative to the center of the display based on determining that one or more infinite vertical planes are detected.

36. The system of claim 33, wherein the processor detects the plane for the scene based on an operating system.

37. The system of claim 33, wherein the processor further performs the steps of:

capturing a third point indicative of a vertical distance of a height of the polygon prism based on determining that there are not additional horizontal planes to capture; and determining geometrical parameters of the polygon prism.

38. The system of claim 37, wherein the processor further performs the steps of:

determining to exclude an area from a face of the polygon prism;

capturing a fourth point using the reticle overlay at a fourth corner;

capturing a fifth point using the reticle overlay at a fifth corner diagonally across the same plane of the fourth point, wherein the fourth corner and the fifth corner are associated with the area to be excluded;

determining the area bounded by the fourth and fifth points; and excluding the determined area from the face of the polygon prism.

39. A computer-implemented method for collaborative augmented reality measurements, comprising:

establishing an audio and visual connection between a mobile device of a first user and a remote device of a second user, whereby the first user can view an augmented reality scene displayed on a display of the mobile device of the first user and the augmented reality scene is transmitted to and displayed on the remote device of the second user, the first user and the second user being able to collaboratively measure an object or a feature of a structure depicted in the augmented reality scene;

receiving a measurement tool selection to measure an object or feature present in the scene displayed on the display;

detecting a plane for the scene displayed on the display;

determining a measurement of the object or feature based on the received measurement tool selection; and transmitting the measurement of the object or feature to a server, wherein the step of determining the measurement of the object or feature comprises:

capturing a first point using a reticle overlay;

capturing a second point using the reticle overlay;

capturing one or more points and linking the one or more points to the first point to close a polygon formed by the first point, the second point, and the one or more points, wherein the polygon is associated with the object or feature;

capturing a third point indicative of a vertical distance of a height of a polygon or a polygon prism formed at least by the polygon;

determining geometrical parameters of the polygon or the polygon prism;

determining to exclude an area from the polygon or from a face of the polygon prism;

capturing a fourth point using the reticle overlay at a first corner;

capturing a fifth point using the reticle overlay at a second corner diagonally across the same plane of the fourth point, wherein the first corner and the second corner are associated with the area to be excluded;

determining the area bounded by the fourth and fifth points; and excluding the determined area from the polygon or from the face of the polygon prism.

40. The computer-implemented method of claim 39, further comprising:

determining an additional polygon that is coplanar with the polygon; and determining a union between the polygon and additional polygon.

41. A computer-implemented method for collaborative augmented reality measurements, comprising:

establishing an audio and visual connection between a mobile device of a first user and a remote device of a second user, whereby the first user can view an augmented reality scene displayed on a display of the mobile device of the first user and the augmented reality scene is transmitted to and displayed on the remote device of the second user, the first user and the second user being able to collaboratively measure an object or a feature of a structure depicted in the augmented reality scene;

receiving a measurement tool selection to measure an object or feature present in the scene displayed on the display;

detecting a plane for the scene displayed on the display;

determining a measurement of the object or feature based on the received measurement tool selection; and transmitting the measurement of the object or feature to a server, wherein the step of determining the measurement of the object or feature comprises:

capturing a first point using a reticle overlay at a first corner;

capturing a second point using the reticle overlay at a second corner diagonally across a horizontal plane of a face of a polygon prism, wherein the first corner and the second corner are associated with the object or feature; and determining whether there are additional horizontal planes to capture.

42. The computer-implemented method of claim 41, further comprising:

capturing a third point indicative of a vertical distance of a height of the polygon prism based on determining that there are not additional horizontal planes to capture; and determining geometrical parameters of the polygon prism.

43. The computer-implemented method of claim 42, further comprising:

determining to exclude an area from a face of the polygon prism;

capturing a fourth point using the reticle overlay at a fourth corner;

capturing a fifth point using the reticle overlay at a fifth corner diagonally across the same plane of the fourth point, wherein the fourth corner and the fifth corner are associated with the area to be excluded;

determining the area bounded by the fourth and fifth points; and excluding the determined area from the face of the polygon prism.

* * * * *